(12) United States Patent
Mu (10) Patent No.: US 12,439,292 B2
(45) Date of Patent: Oct. 7, 2025

(54) DOWNLINK CONTROL INFORMATION SENDING METHOD AND APPARATUS, AND READABLE STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 496 days.

(21) Appl. No.: 17/609,307

(22) PCT Filed: May 9, 2019

(86) PCT No.: PCT/CN2019/086195
§ 371 (c)(1),
(2) Date: Nov. 5, 2021

(87) PCT Pub. No.: WO2020/223960
PCT Pub. Date: Nov. 12, 2020

(65) Prior Publication Data
US 2022/0217581 A1    Jul. 7, 2022

(51) Int. Cl.
*H04W 28/06* (2009.01)
*H04L 5/00* (2006.01)

(52) U.S. Cl.
CPC .......... *H04W 28/06* (2013.01); *H04L 5/0053* (2013.01)

(58) Field of Classification Search
CPC .... H04L 5/0094; H04L 5/0053; H04W 72/23; H04W 28/06
See application file for complete search history.

(56) References Cited

U.S. PATENT DOCUMENTS

| 11,357,022 | B2 * | 6/2022 | Ji | H04W 72/566 |
| 2007/0060167 | A1 * | 3/2007 | Damnjanovic | H04W 52/286 |
| | | | | 455/450 |
| 2013/0107836 | A1 * | 5/2013 | Miki | H04L 5/0091 |
| | | | | 370/329 |
| 2017/0303240 | A1 * | 10/2017 | Basu Mallick | H04W 72/12 |
| 2017/0310444 | A1 * | 10/2017 | Chung | H04L 5/0055 |
| 2018/0139724 | A1 * | 5/2018 | Loehr | H04W 72/02 |
| 2019/0090156 | A1 * | 3/2019 | Kim | H04L 67/12 |
| 2019/0174530 | A1 * | 6/2019 | Kim | H04W 72/0446 |

(Continued)

FOREIGN PATENT DOCUMENTS

| CN | 101605356 A | 12/2009 |
| CN | 101714892 A | 5/2010 |

(Continued)

OTHER PUBLICATIONS

European Patent Application No. 19927709.6 extended Search and Opinion dated Apr. 22, 2022, 11 pages.

(Continued)

*Primary Examiner* — Syed Ali
(74) *Attorney, Agent, or Firm* — Cozen O'Connor (57) ABSTRACT

A method and an apparatus for sending downlink control information (DCI). The method includes: obtaining a number of transmission blocks scheduled by the DCI; determining whether to compress an information field in the DCI based on the number of the transmission blocks; and sending the DCI based on a compressing mode in response to determining to compress.

11 Claims, 3 Drawing Sheets

(56) References Cited

U.S. PATENT DOCUMENTS

| | | | |
|---|---|---|---|
| 2019/0313370 A1* | 10/2019 | Kim | H04L 5/005 |
| 2019/0363843 A1* | 11/2019 | Gordaychik | H04L 1/08 |
| 2020/0068543 A1* | 2/2020 | Rong | H04L 5/0053 |
| 2021/0021974 A1* | 1/2021 | Kim | H04W 4/12 |
| 2021/0105125 A1* | 4/2021 | Rajagopal | H04W 72/23 |
| 2022/0377783 A1* | 11/2022 | Hu | H04L 1/1896 |

FOREIGN PATENT DOCUMENTS

| | | |
|---|---|---|
| CN | 107852310 A | 3/2018 |
| CN | 109041226 A | 12/2018 |
| CN | 109196936 A | 1/2019 |

OTHER PUBLICATIONS

Sierra Wireless "LTE-M Multiple Transport Block Grant Design Considerations" 3GPP TSG RAN WG1 Meeting #97 R1-1906458; May 2019; 11 pages.

Indian Patent Application No. 202147056546 Office Action dated Apr. 7, 2022, 5 pages.

Indonesian Patent Application No. P00202111185, Office Action dated Nov. 21, 2023, 2 pages.

Indonesian Patent Application No. P00202111185, English translation of Office Action dated Nov. 21, 2023, 2 pages.

\* cited by examiner

DOWNLINK CONTROL INFORMATION SENDING METHOD AND APPARATUS, AND READABLE STORAGE MEDIUM

CROSS-REFERENCE TO RELATED APPLICATION

The present application is a national stage of International Application No. PCT/CN2019/086195, filed on May 9, 2019, the content of which is hereby incorporated by reference in its entirety.

TECHNICAL FIELD

The disclosure relates to a field of wireless communication technologies, in particular to a method for sending downlink control information (DCI), an apparatus for sending DCI and a readable storage medium.

BACKGROUND

With the development of wireless communication technologies, the Internet of Things (IoT) brings great convenience to life and work. Machine Type Communication (MTC) is one of typical representatives of applications of the cellular IoT technology.

SUMMARY

The disclosure provides a method for sending downlink control information (DCI), an apparatus for sending DCI and a readable storage medium. The technical solution of the disclosure will be described as follows.

According to a first aspect of embodiments of the disclosure, a method for sending DCI is provided. The method includes: obtaining a number of transmission blocks scheduled by the DCI; determining whether to compress an information field in the DCI based on the number of the transmission blocks; and sending the DCI based on a compressing mode in response to determining to compress.

According to a second aspect of embodiments of the disclosure, an apparatus for sending DCI is provided. The apparatus includes: a processor and a memory for storing instructions executable by the processor. The processor is configured to: obtain a number of transmission blocks scheduled by the DCI; determine whether to compress an information field in the DCI based on the number of the transmission blocks; and send the DCI based on a compressing mode in response to determining to compress.

According to a third aspect of embodiments of the disclosure, a non-transitory computer-readable storage medium is provided. The computer-readable storage medium comprises executable instructions. When the executable instructions are called by a processor of a base station, the method for sending downlink control information (DCI) according to the first aspect or any implementation of the first aspect is implemented.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It should be understood that "several" mentioned in the disclosure refers to one or more, and "a plurality of" refers to two or more. The term "and/or" describes an association relationship among the associated objects, indicating that there are three types of relationships, for example, A and/or B, i.e., A alone exists, A and B exist at the same time, and B exists alone. The character "/" generally indicates that the associated objects before and after are in an "or" relationship. To facilitate understanding, some application scenarios involved in the disclosure will be briefly introduced below.

In the related art, for MTC communication services, when a terminal transmits MTC data, it needs to know information such as a resource location when sending the MTC data and corresponding modulation/demodulation scheme in advance. The information can be notified to the terminal by a base station in advance through DCI. For example, the base station may send a generated physical resource block (PRB) to the terminal through the DCI. Generally, the base station needs to allocate several bits in the DCI to represent a resource allocation indication field for the PRB. In order to save the number of bits allocated by the base station to the DCI, the base station generally compress the resource allocation indication field of for the PRB in the DCI issued to the terminal each time, thereby reducing the number of bits allocated by the base station to the DCI.

Figure 1:
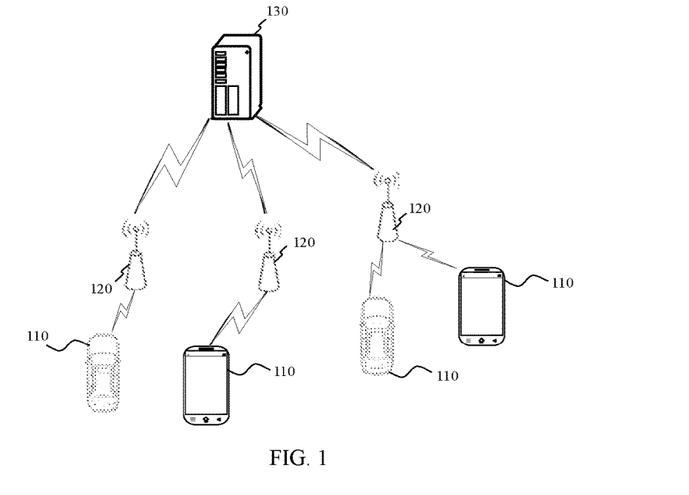
FIG. 1 is a schematic diagram of a wireless communication system according to an embodiment of the disclosure.

FIG. 1 is a schematic diagram of a wireless communication system according to an embodiment of the disclosure. As illustrated in FIG. 1, the wireless communication system is a communication system based on the cellular mobile communication technology. The wireless communication system may include several terminals 110 and several base stations 120.

The terminal 110 may be a device that provides voice and/or data connectivity to a user. The terminal 110 can communicate with one or more core networks via a radio access network (RAN). The terminal 110 can be an IoT terminal, such as a sensor device, a mobile phone (or a cellular phone), and a computer having an IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may also be a device of an unmanned aerial vehicle, an in-vehicle device, or the like.

The base station 120 may be a network side device in the wireless communication system. The wireless communication system may be a 4th generation mobile communication (4G) system, also known as the long term evolution (LTE) system. The wireless communication system may also be a 5G system, also known as the new radio (NR) system. Alternatively, the wireless communication system may also be a next-generation system of the 5G system.

The base station 120 may be an evolved base station (eNB) adopted in the 4G system. Alternatively, the base station 120 may also be a base station (gNB) adopting a centralized and distributed architecture in the 5G system. When the base station 120 adopts the centralized distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 120.

A wireless connection can be established between the base station 120 and the terminal 110 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

Alternatively, the wireless communication system may further include a network management device 130.

A plurality of the base stations 120 are connected to the network management device 130 respectively. The network management device 130 may be a core network device in the wireless communication system. For example, the network management device 130 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 130 is not limited in the embodiment of the disclosure.

In a possible implementation, in the above communication system, MTC data may be transmitted among the terminals 110. Generally, for MTC data, the terminal can support a communication bandwidth of 6 PRBs. In addition, in release 13, the communication bandwidth of the entire system is divided into multiple narrow bands (NBs), so that the terminal can support narrowband communication.

Figure 2:
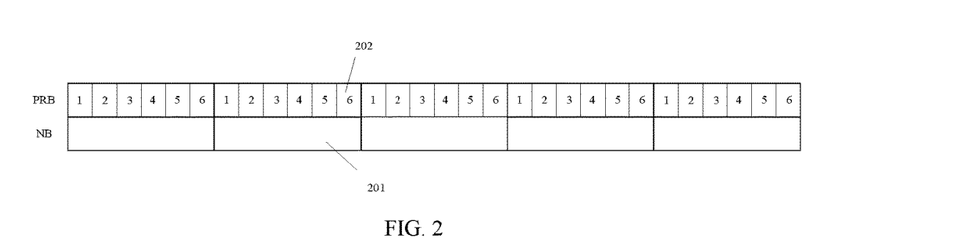
FIG. 2 is a schematic diagram of a correspondence between a narrowband and a physical resource block (PRB) according to an embodiment of the disclosure.

FIG. 2 is a schematic diagram of a correspondence between a narrowband and a PRB according to an embodiment of the disclosure. FIG. 2 illustrates a first narrowband 201, a first PRB resource 202, and the PRB resource numbers (1 to 6) corresponding to each narrowband. As illustrated in FIG. 2, one narrowband can correspond to 6 PRBs. For the narrowband communication based on FIG. 2, the base station can first allocate one of the multiple narrow bands to the terminal that needs to transmit MTC data, and further allocate corresponding PRB resources in the allocated narrowband. When the terminal needs to transmit the MTC data, it can transmit the MTC data on the PRB resources allocated by the base station. For example, the base station may instruct the terminal to transmit the MTC data starting from the position of the first PRB resource 202 of the first narrowband 201 illustrated in FIG. 2. When the terminal needs to transmit the MTC data, it can transmit the MTC data starting from the position of the first PRB resource 202 of the first narrowband 201 allocated by the base station. Alternatively, the base station can reuse the uplink resource allocation type 0 in the long term evolution (LTE) to allocate the PRB resources in the narrowband, that is, to indicate a starting point of the PRB resources and the corresponding amount of the allocated PRB resources. For example, the terminal is instructed to transmit data on 8 continuous PRB resources starting from the position of the first PRB resource 202.

Alternatively, for the narrowband allocation shown in FIG. 2, that is, one narrowband corresponds to 6 PRB resources, in a MTC coverage enhancement mode A (CE mode A), 5 bits are required for the base station to indicate the starting position of the PRB resources and the corresponding amount of the allocated PRB resources for the terminal. The narrowband indication and the narrowband PRB resource allocation indication provided by the base station in the above resource allocation are carried on contents of the DCI. Table 1 contains a mapping relationship between 5-bit information carried in DCI indication information and a specific PRB resource allocation in an embodiment of the disclosure.

TABLE 1

| DCI indication information (5 bit) | Resource starting position (PRB number) | Amount of allocated resources (number of PRBs) | Positions of allocated resources (PRB number set) |
|---|---|---|---|
| 00000 | 1 | 1 | 1 |
| 00001 | 1 | 2 | 1, 2 |
| 00010 | 1 | 3 | 1, 2, 3 |
| 00011 | 1 | 4 | 1, 2, 3, 4 |
| 00100 | 1 | 5 | 1, 2, 3, 4, 5 |
| 00101 | 1 | 6 | 1, 2, 3, 4, 5, 6 |
| 00110 | 2 | 1 | 2 |
| 00111 | 2 | 2 | 2, 3 |
| 01000 | 2 | 3 | 2, 3, 4 |
| 01001 | 2 | 4 | ,2, 3, 4, 5 |
| 01010 | 2 | 5 | 2, 3, 4, 5, 6 |
| 01011 | 3 | 1 | 3 |
| 01100 | 3 | 2 | 3, 4 |
| 01101 | 3 | 3 | 3, 4, 5 |
| 01110 | 3 | 4 | 3, 4, 5, 6 |
| 01111 | 4 | 1 | 4 |
| 10000 | 4 | 2 | 4, 5 |
| 10001 | 4 | 3 | 4, 5, 6 |
| 10010 | 5 | 1 | 5 |
| 10011 | 5 | 2 | 5, 6 |
| 10100 | 6 | 1 | 6 |
| 10101~11111 | | reserved | |

In a possible implementation, similar to the terminal in the traditional LTE, the terminal used to transmit the MTC data can also support different modulation/demodulation schemes to cope with different channel scenarios. The base station needs to use 5 bits in the DCI to indicate the starting position of the PRB resources and the corresponding amount of the allocated PRB resources for the terminal, and 4 bits in the DCI to indicate a modulation/demodulation scheme when the terminal transmits the MTC data. For example, in the MTC CE mode A, the terminal supports 16 kinds of modulation/demodulation schemes in the protocol, and the base station needs to use 4 bits in the DCI to indicate the modulation/demodulation scheme used by the terminal to transmit the data. Table 2 shows a mapping relationship between 4-bit information in the DCI indication information and the MCS in an embodiment of the disclosure.

TABLE 2

| DCI indication information (4 bit) | $I_{MCS}$ | $I_{TBS}$ | $N_{PRB}$ | | | | | |
|---|---|---|---|---|---|---|---|---|
| | | | 1 | 2 | 3 | 4 | 5 | 6 |
| 0000 | 0 | 0 | 16 | 32 | 56 | 88 | 120 | 152 |
| 0001 | 1 | 1 | 24 | 56 | 88 | 144 | 176 | 208 |
| 0010 | 2 | 2 | 32 | 72 | 144 | 176 | 208 | 256 |
| 0011 | 3 | 3 | 40 | 104 | 176 | 208 | 256 | 328 |
| 0100 | 4 | 4 | 56 | 120 | 208 | 256 | 328 | 408 |
| 0101 | 5 | 5 | 72 | 144 | 224 | 328 | 424 | 504 |
| 0110 | 6 | 6 | 328 | 176 | 256 | 392 | 504 | 600 |
| 0111 | 7 | 7 | 104 | 224 | 328 | 472 | 584 | 712 |
| 1000 | 8 | 8 | 120 | 256 | 392 | 536 | 680 | 808 |
| 1001 | 9 | 9 | 136 | 296 | 456 | 616 | 776 | 936 |
| 1010 | 10 | 10 | 144 | 328 | 504 | 680 | 872 | 1032 |
| 1011 | 11 | 11 | 176 | 376 | 584 | 776 | 1000 | 1192 |
| 1100 | 12 | 12 | 208 | 440 | 680 | 904 | 1128 | 1352 |
| 1101 | 13 | 13 | 224 | 488 | 744 | 1000 | 1256 | 1544 |
| 1110 | 14 | 14 | 256 | 552 | 840 | 1128 | 1416 | 1736 |
| 1111 | 15 | 15 | 280 | 600 | 904 | 1224 | 1544 | 1800 |

In Table 2, $I_{mcs}$ represents the number of modulation and coding scheme. $I_{TBS}$ represents the number indicating a size of the transmission block. $N_{PRB}$ represents a number of PRBs. The terminal can determine the corresponding modulation/demodulation scheme according to the 4-bit information corresponding to the MCS contained in the DCI sent by the base station. For example, when $I_{mcs}$ is 3, $N_{PRB}$ is 1, the corresponding number in the table is 40, which means that the number of PRBs allocated by the base station to the terminal is 1, and the terminal is instructed to use the modulation/demodulation scheme with the number of 3 for modulating and demodulating. The corresponding number 40 in the Table 2 indicates that the size of the transmission block is 40 bits.

That is, narrowband PRB resource allocation indication of 5 bits and modulation/demodulation scheme indication of 4 bits can be carried in the DCI sent by the base station to the terminal, to inform the terminal to perform transmission of the MTC data on the corresponding PRB resources according to the indicated modulation/demodulation scheme.

Figure 3:
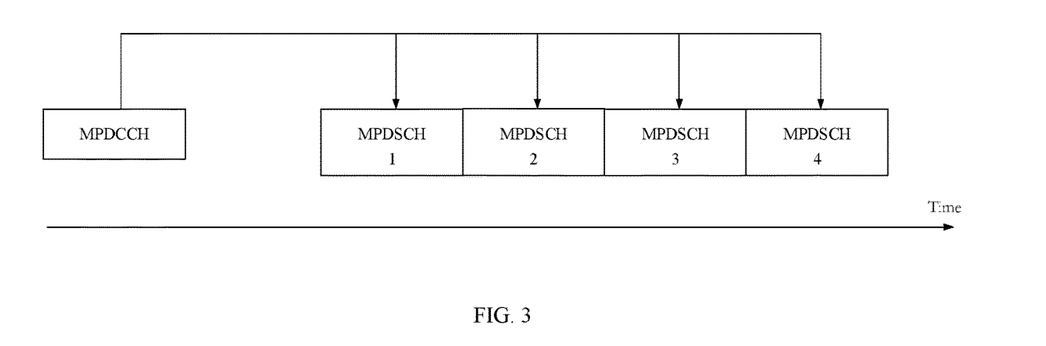
FIG. 3 is a schematic diagram of an MTC physical downlink control channel (MPDCCH) that continuously schedules multiple MTC physical downlink shared channels (MPDSCHs) according to an embodiment of the disclosure.

Alternatively, during transmission of the MTC data, the base station can continuously schedule multiple MTC physical downlink shared channels (MPDSCHs) or multiple MTC physical uplink shared channels (MPUSCHs) on one MTC physical downlink control channel (MPDCCH). That is, the DCI issued by the base station to the terminal can continuously schedule multiple uplink transmission blocks (TBs) or downlink TBs. FIG. 3 shows a schematic diagram of an MPDCCH that continuously schedules multiple MPDSCHs according to an embodiment of the disclosure. As illustrated in FIG. 3, one MPDCCH continuously schedules 4 MPDSCHs, that is, when the base station sends one DCI in one MPDCCH, it can schedule the downlink TBs contained in each of the 4 MPDSCHs. Alternatively, in MTC CE mode A, one DCI sent by the base station can schedule 8 uplink or downlink TBs at most. That is, in FIG. 3, one MPDCCH can also schedule 8 MPUSCHs or 8 MPDSCHs continuously.

For the implementation that the DCI sent by the base station can schedule multiple TBs, a shared information field in the DCI can be shared by multiple TBs. For example, the shared information field indicating the resource allocation, the modulation/demodulation scheme, and the number of retransmissions or the like in the DCI may be the same in multiple TBs scheduled by the DCI. That is, different TBs use the same resource allocation, the same modulation/demodulation scheme, and the same number of retransmissions for transmission. In the DCI sent by the base station, only one shared information field is needed to complete the scheduling of each TB. Alternatively, there is also a non-shared information field in the DCI sent by the base station. For example, when the DCI indicates new data indicator (NDI) and redundancy version (RV), it needs to reserve information fields (which may be referred to as a non-shared information field herein) for respective TBs, which are used to indicate the corresponding channel coding respectively during transmission of the NDI and the RV. Alternatively, in the MTC CE mode A, the base station may reserve 8 bits for transmission of the NDI and the RV respectively in the DCI for transmission, and the reserved 8 bits are also carried in the DCI. For example, when one NDI needs to occupy 1-bit information, and one RV needs to occupy 1-bit information, then the base station needs to allocate additional 16-bits information to carry the information fields of the NDI and the RV.

In the related art, in order to avoid an excessive increase in the number of bits allocated by the base station for a single DCI in a case that one DCI schedules multiple TBs, the shared information field in the DCI can be compressed to reduce the number of bits allocated by the base station for the DCI. For example, the allocation of narrowband PRBs allocated by the base station in the resource allocation field is restricted, so that the 5-bit information indicating the PRB resources is compressed, and the allocation of MCS allocated by the base station is restricted, so that the 4-bit information indicating the MCS is compressed, thereby reducing the number of bits included in the DCI. In the related art, when compressing the PRB field and the MCS field included in the DCI, the shared information field in the DCI is compressed to the same degree in any case. For example, the 5-bit information indicating the PRB resources is compressed to 0 bit, and the 4-bit information indicating the MCS is compressed to 1 bit.

When the number of TBs scheduled in the DCI is 8, and the number of bits required for the NDI and the RV contained in the DCI is 16, then the actual increase in bit overhead of the entire DCI is 8 bits. In this case, the shared information field in the DCI is compressed according to the above compressing mode, which can achieve the effect of reducing the number of bits contained in the DCI. However, the number of bits required for the NDI and the RV is related to the number of TBs actually scheduled, for example, when only 2 TBs are scheduled in the DCI, the actual number of bits required for the NDI and the RV is 4 bits. The 8 bits added in the DCI can completely characterize the NDI and the RV of each TB, and there is no need to compress the shared information field. If the shared information field is still compressed, it will cause decrease of the positions of the PRB resources or the MCSs used by the terminal when transmitting the TBs, which will affect the flexibility of the terminal when transmitting the data.

Figure 4:
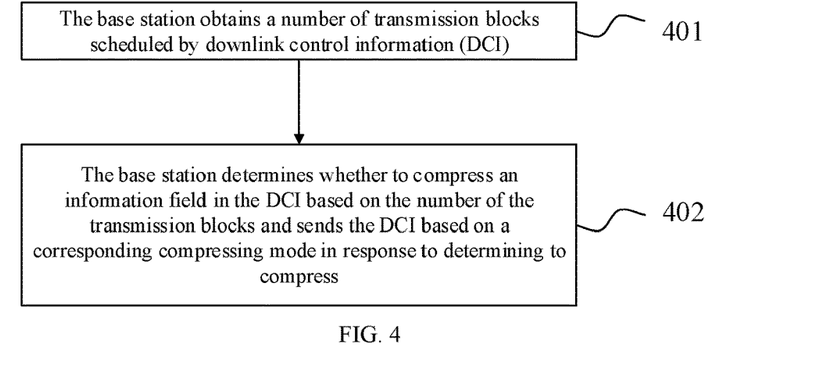
FIG. 4 is a flowchart of a method for sending downlink control information (DCI) according to an embodiment of the disclosure.

In order to solve the above problems in the related art, in the case of compressing the number of bits in the DCI, without losing the flexibility of the terminal to transmit data, the disclosure provides a method for sending DCI. FIG. 4 is a flowchart of a method for sending DCI according to an embodiment of the disclosure. The method can be applied to the wireless communication system shown in FIG. 1, and is executed by a base station in the system. As illustrated in FIG. 4, the method may include the following.

In 401, the base station obtains a number of transmission blocks scheduled by the DCI.

In 402, the base station determines whether to compress an information field in the DCI based on the number of the transmission blocks, and sends the DCI based on a corresponding compressing mode in response to determining to compress.

Alternatively, determining whether to compress the information field in the DCI based on the number of the transmission blocks, and sending the DCI based on the corresponding compressing mode in response to determining to compress, includes: obtaining an amount of information of the DCI before compression based on the number of the transmission blocks; determining whether the information field in the DCI needs to be compressed based on a size relationship between the amount of information and a threshold value; and determining the compressing mode in response to determining that the information field needs to be compressed.

Alternatively, obtaining the amount of information of the DCI before compression based on the number of the transmission blocks includes: obtaining a number of bits of a shared information field before compression for the transmission blocks and a number of bits of a non-shared information field before compression for the transmission blocks; obtaining a product of the number of bits of the non-shared information field before compression and the number of the transmission blocks; and obtaining a sum of the number of bits of the shared information field before compression and the product as the amount of information.

Alternatively, the shared information field includes a physical resource block (PRB) field and/or a modulation and coding scheme (MCS) field.

Alternatively, the compressing mode is configured to indicate a compressing strategy of the information field in the DCI.

Alternatively, the compressing strategy includes at least one of: compressing a PRB field in the DCI; and, compressing a MCS field in the DCI.

Alternatively, compressing the PRB field in the DCI includes: restricting an amount of allocated resources indicated by the PRB field; or restricting positions of the allocated resources indicated by the PRB field; or restricting the amount of the allocated resources indicated by the PRB field and the positions of the allocated resources indicated by the PRB field.

Alternatively, compressing the MCS field in the DCI includes: restricting the MCS indicated by the MCS field as a fixed MCS; or restricting the MCS indicated by the MCS field as at least two designated MCSs, where the at least two designated MCSs are a part of MCSs supported by a system; or restricting the MCS indicated by the MCS field as at least two MCSs extracted from the MCSs supported by the system based on a designated extracting mode.

Alternatively, the designated extracting mode includes a uniform extracting mode or a non-uniform extracting mode.

In conclusion, the base station obtains the number of transmission blocks scheduled by the DCI, determines whether to compress the information field in the DCI based on the number of the transmission blocks, and sends the DCI based on a corresponding compressing mode in response to determining to compress. In the disclosure, the base station obtains the number of transmission blocks scheduled by the DCI, determines the corresponding compressing mode based on the number of transmission blocks, and compresses the transmitted DCI to a corresponding degree according to the compressing mode, which allows the base station to flexibly adjust the compression degree of the DCI according to the number of transmission blocks, thereby improving the flexibility of the DCI scheduling the transmission blocks while limiting the number of bits of the DCI, and expanding the application scenarios of compressing the DCI.

Figure 5:
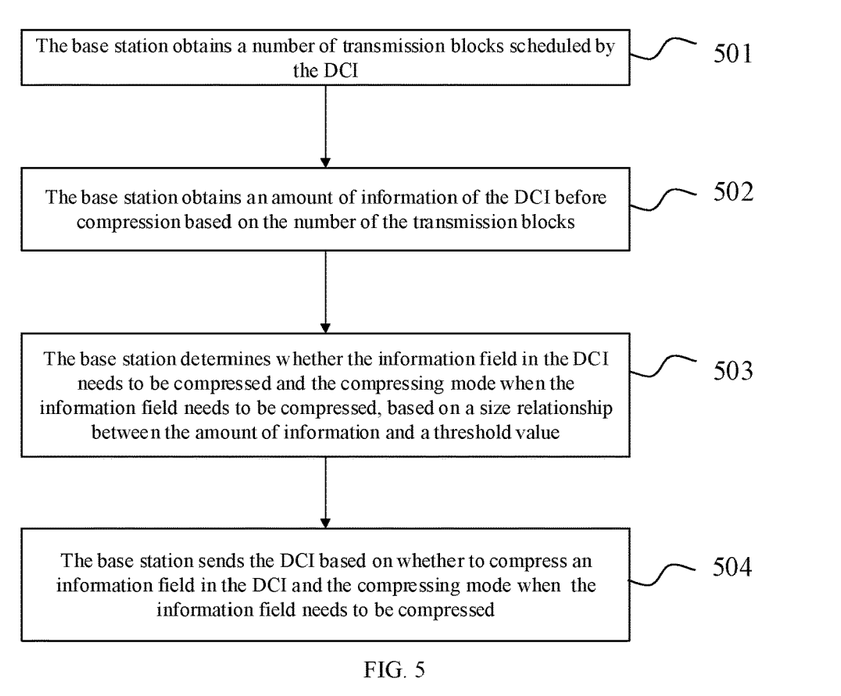
FIG. 5 is a flowchart of a method for sending DCI according to an embodiment of the disclosure.

FIG. 5 is a flowchart of a method for sending DCI according to an embodiment of the disclosure. As illustrated in FIG. 5, the method for sending DCI may be applied to the wireless communication system shown in FIG. 1 and executed by a base station in the system. The method may include the following.

In 501, the base station obtains a number of transmission blocks scheduled by the DCI.

In the wireless communication system, when the terminal transmits data through a wireless cellular network, it often learns a position of a time-frequency resource for transmitting the data and the MCS used when transmitting the data in the DCI signaling issued by the base station. For example, when the terminal transmits the MTC data, it can receive the DCI issued by the base station, and obtains the position of the PRB resource and the MCS allocated by the base station for itself according to indication information carried in the DCI. When the base station generates the DCI to be issued, it can first obtain the number of TBs that the DCI needs to schedule (for example, when a DCI needs to schedule 4 TBs, the number of TBs scheduled in the DCI obtained by the base station is 4), to allocate a corresponding number of bits to the DCI to be issued, so as to satisfy the amount of information required by the DCI to indicate the resource transmission position and the MCS of each TB scheduled therein.

In 502, the base station obtains an amount of information of the DCI before compression based on the number of the transmission blocks.

Alternatively, when the base station generates a DCI, the number of bits allocated to the shared information field contained in the DCI may be fixed. Alternatively, the shared information field may include a PRB field and/or a MCS field. For example, in the above PRB field, the base station may allocate the amount of information of 5 bits to the PRB field, that is, use the amount of information of 5 bits to indicate the PRB field included in the DCI. In the above MCS field, the base station can allocate the amount of information of 4 bits to the MCS field, that is, the amount of information of 4 bits is used to indicate the MCS field included in the DCI.

Alternatively, when the base station generates a DCI, the number of bits allocated to the non-shared information field contained in the DCI may be calculated based on the number of TBs. Alternatively, the non-shared information field may include an NDI field and a RV field. For example, in each TB scheduled by the DCI, the numbers of bits corresponding respectively to the NDI field and the RV field before compression for each TB are both 1, when the number of TBs scheduled by the DCI is N (N is an integer greater than 1), the number of bits required for the non-shared information field in the DCI is 2N, and the base station can allocate the amount of information of 2N bits to the non-shared information field included in the DCI.

Alternatively, the base station may obtain the number of bits of the shared information field before compression for the TBs and the number of bits of the non-shared information field before compression for the TBs. Alternatively, assuming that the number of bits allocated to the shared information field is fixed, and the number of bits allocated to the non-shared information field is related to the number of TBs actually scheduled in the DCI, when the base station allocates the amount of information of 5 bits to the PRB field in the shared information field (i.e., the amount of information of 5 bits is used to indicate the PRB field in the DCI), and allocates the amount of information of 4 bits to the MCS field in the shared information field (i.e., the amount of information of 4 bits is used to indicate the MCS field included in the DCI), the number of bits of the shared information field before compression acquired by the base station is 9. Alternatively, assuming that the numbers of bits corresponding respectively to the NDI field and the RV field before compression for each TB are both 1, the number of bits of the non-shared information field before compression acquired by the base station is 2.

Alternatively, the base station may obtain a product of the number of bits of the non-shared information field before compression and the number of TBs based on the number of TBs. That is, the number of bits actually required for the non-shared information field in the DCI is calculated. For example, when the base station acquires the number of TBs scheduled by the DCI, which is N, the number of bits actually required for the non-shared information field in the DCI is 2N.

Alternatively, the base station may obtain a sum of the number of bits of the shared information field before the compression and the product as the amount of information of the DCI before the compression. That is, the sum of the number of bits of the shared information field before the compression obtained by the base station and the obtained product is the amount of information of the DCI before compression. Assuming that the obtained number of bits of the shared information field before compression is 9, and the number of bits actually required for the non-shared information field is 2N, the amount of information before compression obtained by the base station the DCI is (9+2N) bits.

In 503, the base station determines whether the information field in the DCI needs to be compressed and the compressing mode when the information field needs to be compressed, based on a size relationship between the amount of information and a threshold value.

Alternatively, the threshold value may be a fixed amount of information allocated to the DCI when the base station generates the DCI. That is, no matter how many TBs are scheduled by the DCI, the amount of information allocated by the base station to the DCI is equal to the threshold value. For example, in a possible implementation, the amount of information allocated by the base station to DCI used for the PRB field, the MCS field, the NDI field, and the RV field is M bits (M is an integer greater than or equal to 16). Regardless of how many TBs are scheduled by the DCI, the DCI carries the amount of information of M bits to indicate the PRB field, the MCS field, the NDI field, and the RV field respectively.

The base station may compare the acquired amount of information with the threshold value, and when the amount of information is greater than the threshold value, it is determined that the shared information field in the DCI needs to be compressed. When the amount of information is less than or equal to the threshold value, it is determined that the shared information field in the DCI does not need to be compressed. Taking the amount of information obtained by the above base station being (9+2N) bits as an example, when (9+2N)>M, the shared information field in the DCI needs to be compressed. Otherwise, there may be no need to compress the shared information field in the DCI. When the base station compresses the shared information field in the DCI, the amount of information of the DCI after compression only needs to be no more than M.

Alternatively, the compressing mode may be used to indicate a compressing strategy for the information field in the DCI. That is, the compressing mode may also indicate to compress a part of or all of the information field in the shared information field in the DCI. Alternatively, the compressing strategy includes at least one of: compressing the PRB field in the DCI; and compressing the MCS field in the DCI.

In a possible implementation, assuming that the amount of information of the DCI before compression obtained by the base station is (9+2N) bits, the base station allocates the amount of information of 5 bits to the PRB field and the amount of information of 4 bits to the MCS field. When (9+2N)>M, the base station can compress the amount of information of 5 bits allocated to the PRB field in the DCI, or, the base station may compress the amount of information of 4 bits allocated to the MCS field in the DCI, or the base station may also compress both the amount of information allocated to the PRB field and the amount of information allocated to the MCS field in the DCI.

Take M=16 as an example, that is, the amount of information used by the base station for the PRB field, the MCS field, the NDI field, and the RV field in the DCI is up to 16 bits. When the base station obtains that the amount of information of the PRB field before compression is 5 bits, the amount of information of the MCS field before compression is 4 bits, the amount of information of the NDI field is 1 bit, and the amount of information of the RV field is 1 bit, the base station obtains that the amount of information actually required for the NDI field and the RV field is 2N bits based on the number of TBs scheduled by the DCI which is N. In this case, the compressing strategy adopted by the base station can be referred to Table 3 below. Table 3 shows a schematic result of a compressing strategy executed by a base station according to an embodiment of the disclosure.

TABLE 3

| Number of scheduled TBs | NDI/ bit | RV/ bit | MCS/ bit | PRB/ bit | Remaining bit |
|---|---|---|---|---|---|
| 1 | 1 | 1 | 4 | 5 | 5 |
| 2 | 2 | 2 | 4 | 5 | 3 |
| 3 | 3 | 3 | 4 | 5 | 1 |
| 4 | 4 | 4 | 4 | 4 | 0 |
| 5 | 5 | 5 | 2 | 4 | 0 |
| 6 | 6 | 6 | 2 | 2 | 0 |
| 7 | 7 | 7 | 1 | 1 | 0 |
| 8 | 8 | 8 | 0 | 0 | 0 |

As shown in Table 3, when N is less than 4, the amount of information of the DCI before compression obtained by the base station is less than 16 bits, so there is no need to compress the information field in the DCI. When N is greater than or equal to 4, the amount of information of the DCI before compression obtained by the base station is greater than 16 bits, the base station needs to compress the information field in the DCI. As shown in Table 3, the base station can select a corresponding compressing mode based on the number of TBs, to compress the shared information field in the DCI. For example, it can be seen from Table 3 that when the number of TBs is 4, the base station can compress 5 bits of the PRB field to 4 bits, (that is, the amount of information of 4 bits is used to indicate the PRB field in the DCI), so that the number of bits allocated by the base station to the DCI is not greater than the threshold value of 16. In a possible implementation, when the number of TBs is 4, the base station can also compress the 4 bits of the MCS field to 3 bits without compressing the 5 bits of the PRB field, to make the number of bits allocated by the base station to the DCI not greater than the threshold value of 16. The disclosure does not limit the specific compressing strategy.

Table 4 shows a schematic result of a compressing strategy executed by a base station according to an embodiment of the disclosure.

TABLE 4

| Number of scheduled TBs | NDI/ bit | RV/ bit | MCS/ bit | PRB/ bit | Remaining bit |
|---|---|---|---|---|---|
| 1 | 1 | 1 | 4 | 5 | 5 |
| 2 | 2 | 2 | 4 | 5 | 3 |
| 3 | 3 | 3 | 4 | 5 | 1 |
| 4 | 4 | 4 | 2 | 2 | 4 |
| 5 | 5 | 5 | 2 | 2 | 2 |
| 6 | 6 | 6 | 2 | 2 | 0 |
| 7 | 7 | 7 | 0 | 0 | 2 |
| 8 | 8 | 8 | 0 | 0 | 0 |

As shown in Table 4, when the number of TBs is between 4 and 6, the base station can compress 5 bits of the PRB field in the DCI to 2 bits and compress 4 bits of the MCS field to 2 bits. When the number of TBs is 7 or 8, the base station compresses 5 bits of the PRB field in the DCI to 0 bit, and compresses 4 bits of the MCS field to 0 bit. In a possible implementation, when the information field in the DCI needs to be compressed, the base station can also use a single compressing strategy. For example, when the number of TBs is greater than 4, the base station can compress 5 bits of the PRB field in the DCI to 0 bit, and compress the 4 bits of the MCS field to 0 bit. It should be noted that when the base station compresses 5 bits of the PRB field in the DCI to 0 bit and compresses 4 bit of the MCS field to 0 bit, that is, the base station does not indicate the specific PRB resources and the MCS of the terminal in the DCI, but directly adopts a default PRB resource and a default MCS to transmit the MTC data.

Alternatively, the base station compresses the PRB indication field in the DCI by: restricting an amount of allocated resources indicated by the PRB field. In a possible implementation, when the base station compresses the PRB field, it restricts the amount of allocated resources indicated by the PRB field to 6 PRBs, which is equivalent to all PRB resources in a narrowband, so that no additional bit is required to indicate the PRB field. In the MTC CE mode A, the amount of information of 5 bits can be directly saved by compression, that is, DCI can carry 5 bits less.

In a possible implementation, when the base station compresses the PRB field, it restricts the amount of allocated resources indicated by the PRB field to 6 PRBs or 4 PRBs. In this case, the base station can use 2 bits for indication of the PRB field, in the MTC CE mode A, the base station can directly save the amount of information of 3 bits by compression, that is, the DCI can carry 3 bits less. Table 5 shows a mapping relationship between 3-bit information carried in the DCI indication information and the specific PRB resource allocation according to an embodiment of the disclosure.

TABLE 5

| DCI indication information (2 bit) | Resource start position (PRB number) | Amount of allocated resources (number of PRBs) | Positions of allocated resource (PRB number set) |
|---|---|---|---|
| 00 | 1 | 4 | 1, 2, 3, 4 |
| 01 | 2 | 4 | 2, 3, 4, 5 |
| 10 | 3 | 4 | 3, 4, 5, 6 |
| 11 | 1 | 6 | 1, 2, 3, 4, 5, 6 |

As shown in Table 5, the base station can use 2 bits to indicate the PRB field in the DCI.

Alternatively, when the base station compresses the PRB indication field in the DCI, it may also restrict the positions of allocated resources indicated by the PRB field. In a possible implementation, when the base station compresses the PRB field, it can restrict the amount of allocated resources indicated by the PRB field to correspond to a set of positions of the allocated resource. For example, the amount of allocated resources of 4 PRBs corresponds to the set of positions (3, 4, 5, 6), that is, when the amount of allocated resources of the PRB field in the DCI is 4, it indicates that the terminal can transmit data at resource positions (3, 4, 5, 6) in a narrowband. In this case, the base station can use 3 bits to indicate the PRB field. In the MTC CE mode A, the amount of information of 2 bits can be directly saved by compression, that is, DCI can carry 2 bits less. Table 6 shows a mapping relationship between the 3-bit information carried in the DCI indication information and the specific PRB resource allocation according to an embodiment of the disclosure.

TABLE 6

| DCI indication information (3 bit) | Resource start position (PRB number) | Amount of allocated resources (number of PRBs) | Positions of allocated resource (PRB number set) |
|---|---|---|---|
| 000 | 1 | 6 | 1, 2, 3, 4, 5, 6 |
| 001 | 2 | 5 | 2, 3, 4, 5, 6 |

TABLE 6-continued

| DCI indication information (3 bit) | Resource start position (PRB number) | Amount of allocated resources (number of PRBs) | Positions of allocated resource (PRB number set) |
|---|---|---|---|
| 010 | 3 | 4 | 3, 4, 5, 6 |
| 011 | 4 | 3 | 4, 5, 6 |
| 100 | 5 | 2 | 5, 6 |
| 101 | 6 | 1 | 6 |
| 110~111 | | reserved | |

Alternatively, when the base station compresses the PRB indication field in the DCI, it can restrict both the amount of allocated resources indicated by the PRB field and the positions of allocated resources indicated by the PRB field. In a possible implementation, when the base station compresses the PRB field, it can restrict the amount of allocated resources indicated by the PRB field to 3, 4, 5, and 6, respectively. Moreover, for each kind of amount of allocated resources, the positions of allocated resources are also restricted. Table 7 shows a mapping relationship between the 2-bit information carried in the DCI indication information and the specific PRB resource allocation according to an embodiment of the disclosure.

TABLE 7

| DCI indication information 2 bit | Resource start position (PRB number) | Amount of allocated resources (number of PRBs) | Positions of allocated resource (PRB number set) |
|---|---|---|---|
| 00 | 1 | 6 | 1, 2, 3, 4, 5, 6 |
| 01 | 2 | 5 | 2, 3, 4, 5, 6 |
| 10 | 3 | 4 | 3, 4, 5, 6 |
| 11 | 4 | 3 | 4, 5, 6 |

It can be seen from Table 7 that for the restricted amount of allocated PRB resources, each corresponds to a unique set of positions of allocated resources. In this case, the base station can also use 2 bits to indicate the PRB field. In the MTC CE mode A, the amount of information of 3 bits can be directly saved by compression, that is, DCI can carry 3 bits less.

Alternatively, the base station compresses the MCS field in the DCI by: restricting the MCS indicated by the MCS field as a fixed MCS. In a possible implementation, when the base station compresses the MCS field, it restricts the MCS indicated by the MCS field as a fixed MCS. For example, the developer sets the fixed MCS to be the MCS corresponding to $I_{MCS}$=15 in Table 2. When the base station allocates the MCS field, no additional bit is needed to indicate the MCS field. When the terminal does not find indication of the MCS field in the received DCI, it automatically selects the MCS corresponding to $I_{mcs}$ which is 15 for modulating and demodulating. Therefore, in the MTC CE mode A, the amount of information of 4 bits can be directly saved by compression, that is, the DCI can carry 4 bits less.

Alternatively, when the base station compresses the MCS field in the DCI, the base station may also restrict the MCS indicated by the MCS field as at least two designated MCSs, in which the at least two designated MCSs are a part of MCSs supported by the system.

In a possible implementation, taking two designated MCSs as an example, when the base station compresses the MCS field, it restricts the MCS indicated by the MCS field to the two designated fixed MCSs. For example, the developer sets two fixed MCSs, i.e., the MCSs corresponding respectively to $I_{MCS}$=14 and $I_{MCS}$=15 in Table 2. When the base station allocates the MCS field, only additional 1 bit is needed to indicate the MCS field. Therefore, in the MTC CE mode A, the amount of information of 3 bits can be directly saved by compression, that is, the DCI can carry 3 bits less. Table 8 shows a mapping relationship between 1-bit information in the DCI indication information and the MCS according to an embodiment of the disclosure.

TABLE 8

| DCI indication information (1 bit) | $I_{MCS}$ | $I_{TBS}$ | $N_{PRB}$ | | | | | |
|---|---|---|---|---|---|---|---|---|
| | | | 1 | 2 | 3 | 4 | 5 | 6 |
| 0 | 14 | 14 | 256 | 552 | 840 | 1128 | 1416 | 1736 |
| 1 | 15 | 15 | 280 | 600 | 904 | 1224 | 1544 | 1800 |

Alternatively, when the base station compresses the MCS field of the DCI, the MCS indicated by the MCS field may also be restricted to at least two MCSs extracted from the MCSs supported by the system based on a designated extracting mode. Alternatively, the designated extracting mode includes a uniform extracting mode or a non-uniform extracting mode. In a possible implementation, taking the specified extracting mode of uniformly extracting 4 MCSs as an example, when the base station compresses the MCS field, it restricts the MCS indicated by the MCS field to 4 fixed MCSs that are uniformly extracted. For example, the 4 fixed MCSs that are uniformly extracted are the MCSs corresponding respectively to $I_{MCS}$=3, $I_{MCS}$=7, $I_{MCS}$=11 and $I_{MCS}$=15 in Table 2, when the base station allocates the MCS field, only additional 2 bits are needed to indicate the MCS field. Therefore, in the MTC CE mode A, the amount of information of 2 bits can be directly saved by compression, that is, DCI can carry 2 bits less. Table 9 shows a mapping relationship between the 2-bit information in the DCI indication information and the MCS according to an embodiment of the disclosure.

TABLE 9

| DCI indication information (1 bit) | $I_{MCS}$ | $I_{TBS}$ | $N_{PRB}$ | | | | | |
|---|---|---|---|---|---|---|---|---|
| | | | 1 | 2 | 3 | 4 | 5 | 6 |
| 00 | 3 | 3 | 40 | 104 | 176 | 208 | 256 | 328 |
| 01 | 7 | 7 | 104 | 224 | 328 | 472 | 584 | 712 |
| 10 | 11 | 11 | 176 | 376 | 584 | 776 | 1000 | 1192 |
| 11 | 15 | 15 | 280 | 600 | 904 | 1224 | 1544 | 1800 |

In a possible implementation, taking the specified extracting mode of non-uniformly extracting 4 MCSs as an example, when the base station compresses the MCS field, the MCS indicated by the MCS field is restricted to the 4 fixed MCSs extracted non-uniformly. For example, the 4 fixed MCSs extracted non-uniformly are the MCSs corresponding respectively to $I_{MCS}$=1, $I_{MCS}$=7, $I_{MCS}$=11 and $I_{MCS}$=15 in Table 2. When the base station allocates the MCS field, only additional 2 bits are needed to indicate the MCS field. Therefore, in the MTC CE mode A mode, the amount of information of 2 bits can be directly saved by compression, that is, the DCI can carry 2 bits less. Table 10 shows a mapping relationship between the 2-bit information in the DCI indication information and the MCS according to an embodiment of the disclosure.

TABLE 10

| DCI indication information (1 bit) | $I_{MCS}$ | $I_{TBS}$ | $N_{PRB}$ | | | | | |
|---|---|---|---|---|---|---|---|---|
| | | | 1 | 2 | 3 | 4 | 5 | 6 |
| 00 | 1 | 1 | 24 | 56 | 88 | 144 | 176 | 208 |
| 01 | 7 | 7 | 104 | 224 | 328 | 472 | 584 | 712 |
| 10 | 11 | 11 | 176 | 376 | 584 | 776 | 1000 | 1192 |
| 11 | 15 | 15 | 280 | 600 | 904 | 1224 | 1544 | 1800 |

In 504, the base station sends the DCI based on whether to compress the information field in the DCI and the compressing mode when the information field needs to be compressed.

Alternatively, the base station may determine whether the information field in the DCI needs to be compressed through the above step according to the number of TBs. When it is determined that the information field needs to be compressed, the base station can compress the information field in the DCI according to a compressing mode corresponding to the number of TBs scheduled in the DCI, and send the compressed DCI to the terminal through the MPDCCH. When the base station determines that it is unnecessary to compress the information field in the DCI, the base station can also choose not to compress the information field in the DCI and directly issue the DCI.

In conclusion, the base station obtains the number of transmission blocks scheduled by the DCI, determines whether to compress the information field in the DCI based on the number of the transmission blocks, and sends the DCI based on a corresponding compressing mode in response to determining to compress. In the disclosure, the base station obtains the number of transmission blocks scheduled by the DCI, determines the corresponding compressing mode based on the number of transmission blocks, and compresses the transmitted DCI to a corresponding degree according to the compressing mode, which allows the base station to flexibly adjust the compression degree of the DCI according to the number of transmission blocks, thereby improving the flexibility of the DCI scheduling the transmission blocks while limiting the number of bits in the DCI, and expanding the application scenarios of compressing the DCI.

The following are device embodiments of the disclosure, which can be used to implement the method embodiments of the disclosure. For details that are not disclosed in the device embodiments of the disclosure, refer to the method embodiments of the disclosure.

Figure 6:
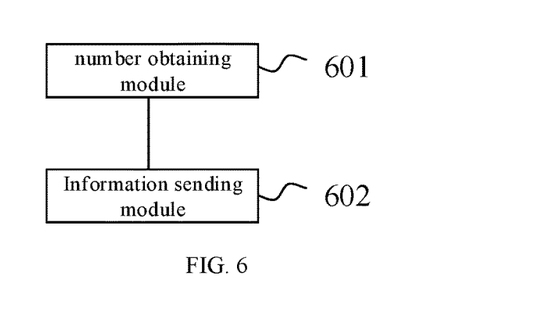
FIG. 6 is a block diagram of an apparatus for sending DCI according to an example embodiment.

FIG. 6 is a block diagram of an apparatus for sending DCI according to an example embodiment. As illustrated in FIG. 6, the apparatus can be implemented as all or a part of the base station in the implementation environment shown in FIG. 1 through hardware or a combination of software and hardware, so as to perform the steps performed by the base station according to any of the embodiments shown in FIG. 4 or FIG. 5. The apparatus may include: a number obtaining module 601 and an information sending module 602.

The number obtaining module 601 is configured to obtain a number of transmission blocks scheduled by the DCI.

The information sending module 602 is configured to determine whether to compress an information field in the DCI based on the number of the transmission blocks, and send the DCI based on a corresponding compressing mode in response to determining to compress.

Alternatively, the information sending module 602 includes: an information amount obtaining sub-module and a compressing mode determining sub-module.

The information amount obtaining sub-module is configured to obtain an amount of information of the DCI before compression based on the number of the transmission blocks.

The compressing mode determining sub-module is configured to determine the compressing mode based on a size relationship between the amount of information and a threshold value.

Alternatively, the information amount obtaining sub-module includes: a first obtaining unit and a second obtaining unit.

The first obtaining unit is configured to obtain a number of bits of a shared information field before compression for the transmission blocks and a number of bits of a non-shared information field before compression for the transmission blocks.

The second obtaining unit is configured to obtain a product of the number of bits of the non-shared information field before compression and the number of the transmission blocks.

A sum of the number of bits of the shared information field before compression and the product is the amount of information.

Alternatively, the shared information field includes a PRB field and/or a MCS field.

Alternatively, the compressing mode is configured to indicate a compressing strategy of the information field in the DCI.

Alternatively, the compressing strategy includes at least one of: compressing a PRB field in the DCI; and, compressing a MCS field in the DCI.

Alternatively, compressing the PRB field in the DCI includes: restricting an amount of allocated resources indicated by the PRB field; or restricting positions of the allocated resources indicated by the PRB field; or restricting the amount of the allocated resources indicated by the PRB field and the positions of the allocated resources indicated by the PRB field.

Alternatively, compressing the MCS field in the DCI includes:
restricting the MCS indicated by the MCS field as a fixed MCS; or
restricting the MCS indicated by the MCS field as at least two designated MCSs, where the at least two designated MCSs are a part of MCSs supported by a system; or
restricting the MCS indicated by the MCS field as at least two MCSs extracted from the MCSs supported by the system based on a designated extracting mode.

Alternatively, the designated extracting mode includes a uniform extracting mode or a non-uniform extracting mode.

It should be noted that, when the apparatus provided in the above embodiments realizes its functions, only the division of the above functional modules is used as an example for illustration. In actual applications, the above-mentioned functions can be allocated by different functional modules according to actual needs. That is, the content structure of the apparatus is divided into different functional modules to complete all or part of the above functions.

Regarding the apparatus in the embodiments, the specific manner in which each module performing operations has been described in detail in the embodiments of the method, and detailed description will not be given here.

An exemplary embodiment of the disclosure provides an apparatus for sending DCI, which can implement all or a part of the steps performed by the base station in the embodiment shown in FIG. 4 or FIG. 5 of the disclosure.

The apparatus for sending DCI includes: a processor and a memory for storing instructions executable by the processor. The processor is configured to obtain a number of transmission blocks scheduled by the DCI; determine whether to compress an information field in the DCI based on the number of the transmission blocks; and send the DCI based on a corresponding compressing mode in response to determining to compress.

Alternatively, when determining whether to compress the information field in the DCI based on the number of the transmission blocks, and sending the DCI based on the corresponding compressing mode in response to determining to compress, the processor is configured to: obtain an amount of information of the DCI before compression based on the number of the transmission blocks; determine whether the information field in the DCI needs to be compressed based on a size relationship between the amount of information and a threshold value; and determine the compressing mode in response to determining that the information field needs to be compressed.

Alternatively, when obtaining the amount of information of the DCI before compression based on the number of the transmission blocks, the processor is configured to: obtain a number of bits of a shared information field before compression for the transmission blocks and a number of bits of a non-shared information field before compression for the transmission blocks; obtain a product of the number of bits of the non-shared information field before compression and the number of the transmission blocks; and obtain a sum of the number of bits of the shared information field before compression and the product as the amount of information.

Alternatively, the shared information field includes a PRB field and/or a MCS

FIELD

Alternatively, the compressing mode is configured to indicate a compressing strategy of the information field in the DCI.

Alternatively, the compressing strategy includes at least one of: compressing a PRB field in the DCI; and, compressing a MCS field in the DCI.

Alternatively, compressing the PRB field in the DCI includes: restricting an amount of allocated resources indicated by the PRB field; or restricting positions of the allocated resources indicated by the PRB field; or restricting the amount of the allocated resources indicated by the PRB field and the positions of the allocated resources indicated by the PRB field.

Alternatively, compressing the MCS field in the DCI includes:
restricting the MCS indicated by the MCS field as a fixed MCS; or
restricting the MCS indicated by the MCS field as at least two designated MCSs, where the at least two designated MCSs are a part of MCSs supported by a system; or
restricting the MCS indicated by the MCS field as at least two MCSs extracted from the MCSs supported by the system based on a designated extracting mode.

Alternatively, the designated extracting mode includes a uniform extracting mode or a non-uniform extracting mode.

The foregoing mainly takes a base station as an example to introduce the solution provided by the embodiments of the disclosure. It can be understood that, in order to implement the above functions, the base station includes hardware structures and/or software modules corresponding to each function. In combination with the modules and algorithm steps of the examples described in the embodiments of the disclosure, the embodiments of the disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solution of the embodiments of the disclosure.

Figure 7:
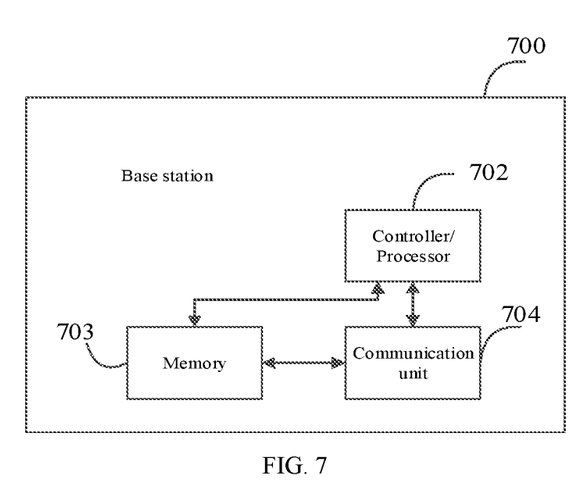
FIG. 7 is a schematic diagram of a base station according to an example embodiment.

FIG. 7 is a schematic diagram of a base station according to an example embodiment.

The base station 700 includes a communication unit 704 and a processor 702. The processor 702 may also be a controller, which is represented as "controller/processor 702" in FIG. 7. The communication unit 704 is configured to support the base station to communicate with other network devices (e.g., terminals, other base stations, and gateways).

Further, the base station 700 may further include a memory 703, and the memory 703 is configured to store program codes and data of the base station 700.

It is understandable that FIG. 7 only shows a simplified design of the base station 700. In practical applications, the base station 700 may include any number of processors, controllers, memories, and communication units, and all terminals that can implement the embodiments of the disclosure are within the protection scope of the embodiments of the disclosure.

Those skilled in the art should be aware that, in one or more of the foregoing examples, the functions described in the embodiments of the disclosure may be implemented by hardware, software, firmware, or any combination thereof. When implemented by software, these functions can be stored in a computer-readable medium or transmitted as one or more instructions or codes on the computer-readable medium. The computer-readable medium includes a computer storage medium and a communication medium. The communication medium includes any medium that facilitates the transfer of a computer program from one place to another. The storage medium may be any available medium that can be accessed by a general or dedicated computer.

The embodiments of the disclosure also provide a computer storage medium having computer software instructions stored thereon, the instructions are used by the above base station, and contain programs for executing the method for sending DCI.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for sending downlink control information (DCI), comprising:
    obtaining a number of transmission blocks scheduled by the DCI;
    determining whether to compress an information field in the DCI based on the number of the transmission blocks by
        obtaining an amount of information of the DCI before compression based on the number of the transmission blocks;
        determining whether the information field in the DCI needs to be compressed based on a size relationship between the amount of information and a threshold value; and
        determining the compressing mode in response to determining that the information field needs to be compressed; and
    sending the DCI based on a compressing mode in response to determining to compress;
    wherein the compressing mode indicates a compressing strategy of the information field in the DCI;
    wherein the compressing strategy comprises compressing a modulation and coding scheme (MCS) field in the DCI;
    wherein compressing the MCS field in the DCI comprises restricting the MCS indicated by the MCS field as at least two MCSs extracted from the MCSs supported by the system based on a designated extracting mode.

2. The method according to claim 1, wherein obtaining the amount of information of the DCI before compression based on the number of the transmission blocks comprises:
    obtaining a number of bits of a shared information field before compression for the transmission blocks and a number of bits of a non-shared information field before compression for the transmission blocks;
    obtaining a product of the number of bits of the non-shared information field before compression and the number of the transmission blocks; and
    obtaining a sum of the number of bits of the shared information field before compression and the product as the amount of information.

3. The method according to claim 2, wherein the shared information field comprises at least one of a physical resource block (PRB) field and the MCS field.

4. The method according to claim 1, wherein the compressing strategy further comprises compressing a PRB field in the DCI comprising one of the following:
    restricting an amount of allocated resources indicated by the PRB field;
    restricting positions of the allocated resources indicated by the PRB field; and
    restricting the amount of the allocated resources indicated by the PRB field and the positions of the allocated resources indicated by the PRB field.

5. The method according to claim 1, wherein the designated extracting mode comprises a uniform extracting mode or a non-uniform extracting mode.

6. An apparatus for downlink control information (DCI), comprising:
    a processor;
    a memory for storing executable instructions of the processor; wherein,
    the processor is configured to:
    obtain a number of transmission blocks scheduled by the DCI;
    determine whether to compress an information field in the DCI based on the number of the transmission blocks by
        obtaining an amount of information of the DCI before compression based on the number of the transmission blocks;
        determining whether the information field in the DCI needs to be compressed based on a size relationship between the amount of information and a threshold value; and
        determining the compressing mode in response to determining that the information field needs to be compressed; and
    send the DCI based on a compressing mode in response to determining to compress;
    wherein the compressing mode indicates a compressing strategy of the information field in the DCI;
    wherein the compressing strategy comprises compressing a modulation and coding scheme (MCS) field in the DCI;
    wherein compressing the MCS field in the DCI comprises restricting the MCS indicated by the MCS field as at least two MCSs extracted from the MCSs supported by the system based on a designated extracting mode.

7. The apparatus according to claim 6, wherein obtaining the amount of information of the DCI before compression based on the number of the transmission blocks comprises:
    obtaining a number of bits of a shared information field before compression for the transmission blocks and a number of bits of a non-shared information field before compression for the transmission blocks;
    obtaining a product of the number of bits of the non-shared information field before compression and the number of the transmission blocks; and
    obtaining a sum of the number of bits of the shared information field before compression and the product as the amount of information.

8. The apparatus according to claim 7, wherein the shared information field comprises at least one of a physical resource block (PRB) field and the MCS field.

9. The apparatus according to claim 6, wherein the compressing strategy further comprises compressing a PRB field in the DCI comprising one of the following:
    restricting an amount of allocated resources indicated by the PRB field;
    restricting positions of the allocated resources indicated by the PRB field; and
    restricting the amount of the allocated resources indicated by the PRB field and the positions of the allocated resources indicated by the PRB field.

10. The apparatus according to claim 6, wherein the designated extracting mode comprises a uniform extracting mode or a non-uniform extracting mode.

11. A non-transitory computer-readable storage medium comprising executable instructions, wherein when the executable instructions are called by a processor of a base station, the processor is caused to perform a method for sending downlink control information (DCI) comprising:
    obtaining a number of transmission blocks scheduled by the DCI;
    determining whether to compress an information field in the DCI based on the number of the transmission blocks by
        obtaining an amount of information of the DCI before compression based on the number of the transmission blocks;

determining whether the information field in the DCI needs to be compressed based on a size relationship between the amount of information and a threshold value; and determining the compressing mode in response to determining that the information field needs to be compressed; and sending the DCI based on a compressing mode in response to determining to compress;

wherein the compressing mode indicates a compressing strategy of the information field in the DCI;

wherein the compressing strategy comprises compressing a modulation and coding scheme (MCS) field in the DCI;

wherein compressing the MCS field in the DCI comprises restricting the MCS indicated by the MCS field as at least two MCSs extracted from the MCSs supported by the system based on a designated extracting mode.

* * * * *